(12) United States Patent
Jiang

(10) Patent No.: US 9,605,819 B2
(45) Date of Patent: Mar. 28, 2017

(54) STREET LIGHT WITH MODULAR LED LIGHT SOURCE

(71) Applicant: HUIZHOU ARRLUX OPTOELECTRONIC CO., LTD., Huizhou (CN)

(72) Inventor: Fei Jiang, Huizhou (CN)

(73) Assignee: HUIZHOU ARRLUX OPTOELECTRONIC CO., LTD., Huizhou (CN)

( * ) Notice: Subject to any disclaimer, the term of this patent is extended or adjusted under 35 U.S.C. 154(b) by 65 days.

(21) Appl. No.: 14/722,079

(22) Filed: May 26, 2015

(65) Prior Publication Data

US 2015/0252972 A1   Sep. 10, 2015

Related U.S. Application Data

(63) Continuation of application No. PCT/CN2013/081394, filed on Aug. 13, 2013.

(30) Foreign Application Priority Data

Nov. 27, 2012   (CN) .......................... 2012 1 0487387

(51) Int. Cl.
  *F21S 8/08*   (2006.01)
  *F21S 8/00*   (2006.01)
  (Continued)

(52) U.S. Cl.
  CPC ............... *F21S 8/085* (2013.01); *F21K 9/00* (2013.01); *F21K 9/60* (2016.08); *F21S 8/00* (2013.01);
  (Continued)

(58) Field of Classification Search
  CPC .... F21V 19/00; F21V 19/001; F21V 19/0015; F21V 19/002; F21V 19/0025;
  (Continued)

(56) References Cited

U.S. PATENT DOCUMENTS 7,637,630 B2 * 12/2009 Wilcox ................. F21V 5/04
                                                                 362/158
7,857,482 B2 * 12/2010 Reo ..................... F21V 5/008
                                                                 362/225

(Continued)

FOREIGN PATENT DOCUMENTS

CN    201196356 Y    2/2009
CN    201277472 Y    7/2009
(Continued)

OTHER PUBLICATIONS

SIPO, International Search Report and Written Opinion, PCT Patent Application No. PCT/CN2013/081394.

(Continued)

*Primary Examiner* — Robert May
(74) *Attorney, Agent, or Firm* — Hemisphere Law, PLLC

(57) ABSTRACT

The present invention relates to a modular LED street light including an electrical chamber, a lamp arm, two supporting pipes, an end cap and a plurality of LED light source modules. The LED light source modules are fixed between the two supporting pipes. Each LED light source module includes a circuit board and a radiator. The radiator includes a first plate, two second plates extending from two sides of the first plate and a third plate connected to the two second plates. The radiator has a large area of heat dissipation. When it is required to increase or decrease the number of the LED light source modules for the purpose of increasing or reducing the power of the LED street light, all that is needed is exchanging with lengthened or shortened supporting pipes, thus enabling a power seriation of the street light at very low costs.

15 Claims, 6 Drawing Sheets

(51) Int. Cl.
*F21K 9/00* (2016.01)
*F21V 19/04* (2006.01)
*F21V 5/04* (2006.01)
*F21V 19/00* (2006.01)
*F21K 9/60* (2016.01)
*F21V 29/00* (2015.01)
*F21W 131/103* (2006.01)
*F21Y 101/00* (2016.01)

(52) U.S. Cl.
CPC .............. *F21V 5/04* (2013.01); *F21V 19/003* (2013.01); *F21V 19/04* (2013.01); *F21V 29/20* (2013.01); *F21W 2131/103* (2013.01); *F21Y 2101/00* (2013.01); *Y02B 20/72* (2013.01)

(58) Field of Classification Search
CPC .. F21V 19/003; F21V 19/0035; F21V 19/004; F21V 19/0045; F21V 19/005; F21V 29/00; F21V 29/002; F21V 29/004; F21V 29/006; F21V 29/50; F21V 29/502; F21V 29/503; F21V 29/504; F21V 29/505; F21V 29/506; F21V 29/507; F21V 29/508; F21Y 2101/02; F21Y 2115/10; F21S 8/08; F21S 8/081; F21S 8/083; F21S 8/085; F21S 8/086; F21S 8/088; F21W 2131/10; F21W 2131/1005; F21W 2131/101; F21W 2131/103; F21W 2131/105; F21W 2131/107; F21W 2131/109
See application file for complete search history.

(56) References Cited

U.S. PATENT DOCUMENTS

| | | | | |
|---|---|---|---|---|
| 7,963,672 B2 * | 6/2011 | Liu | ............ | F21V 17/101 362/249.02 |
| 8,436,375 B2 * | 5/2013 | Miura | ............ | F21V 15/013 257/678 |
| 2009/0135597 A1 * | 5/2009 | Kay | ............ | F21K 9/00 362/247 |
| 2010/0027266 A1 * | 2/2010 | Tsai | ............ | F21V 15/015 362/267 |
| 2012/0106152 A1 | 5/2012 | Zheng et al. | | |
| 2012/0162974 A1 * | 6/2012 | Yu | ............ | F21V 15/013 362/218 |

FOREIGN PATENT DOCUMENTS

| | | |
|---|---|---|
| CN | 201593712 U | 9/2010 |
| CN | 202001885 U | 10/2011 |
| CN | 102313196 A | 1/2012 |
| CN | 202144961 U | 2/2012 |
| CN | 102454895 A | 5/2012 |
| CN | 102537781 A | 7/2012 |
| EP | 2112428 A1 | 10/2009 |
| JP | 2000011704 A | 1/2000 |

OTHER PUBLICATIONS

SIPO, Search Report and Notification of First Office Action, App. No. 201310315961.7.

* cited by examiner

STREET LIGHT WITH MODULAR LED LIGHT SOURCE

CROSS-REFERENCE TO RELATED APPLICATIONS

The present application is a continuation of PCT application No. PCT/CN2013/081394, filed on Aug. 13, 2013, which designates United States and claims priority of China Patent Application No. 201210487387.9, filed on Nov. 27, 2012 which is incorporated herein by reference.

BACKGROUND OF THE INVENTION

1. Field of the Invention

The present invention relates to LED (light emitting diode) street light, particularly relates to a modular LED street light and its LED light source module.

2. Description of Related Art

Existing LED street lights are generally has a one-piece structure, they include a housing and LED light emitting module placed in the housing. Wherein the housing is composed of a face shell and a back shell. The face shell has an opening, the LED light emitting module locates in a chamber behind the opening, the face shell is fixed to the back shell via bolts. The disadvantages of the one-piece structure mainly are that different molds should be designed for producing corresponding back shells and face shells for street lights with different powers, high cost; the radiator is positioned in the back shell, although the strength of the light body reaches the standard, but the heat dissipation effect is dissatisfactory.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The modular LED street light and the LED light source module of the present invention will now be described in detail through several embodiments with reference to the accompanying drawings.

Figure 1:
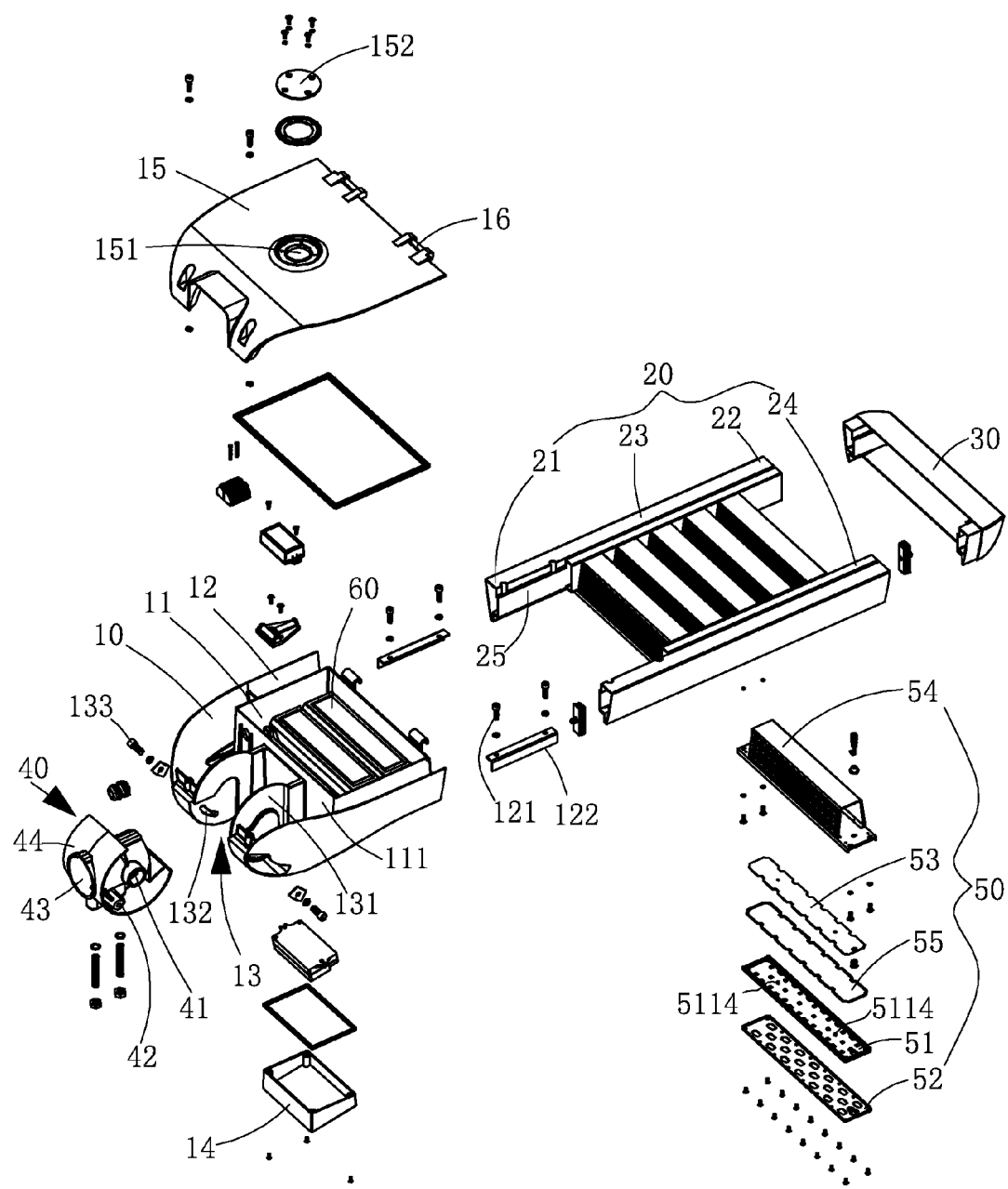
FIG. 1 is an exploded view of a modular LED street light of an embodiment.
Figure 2:
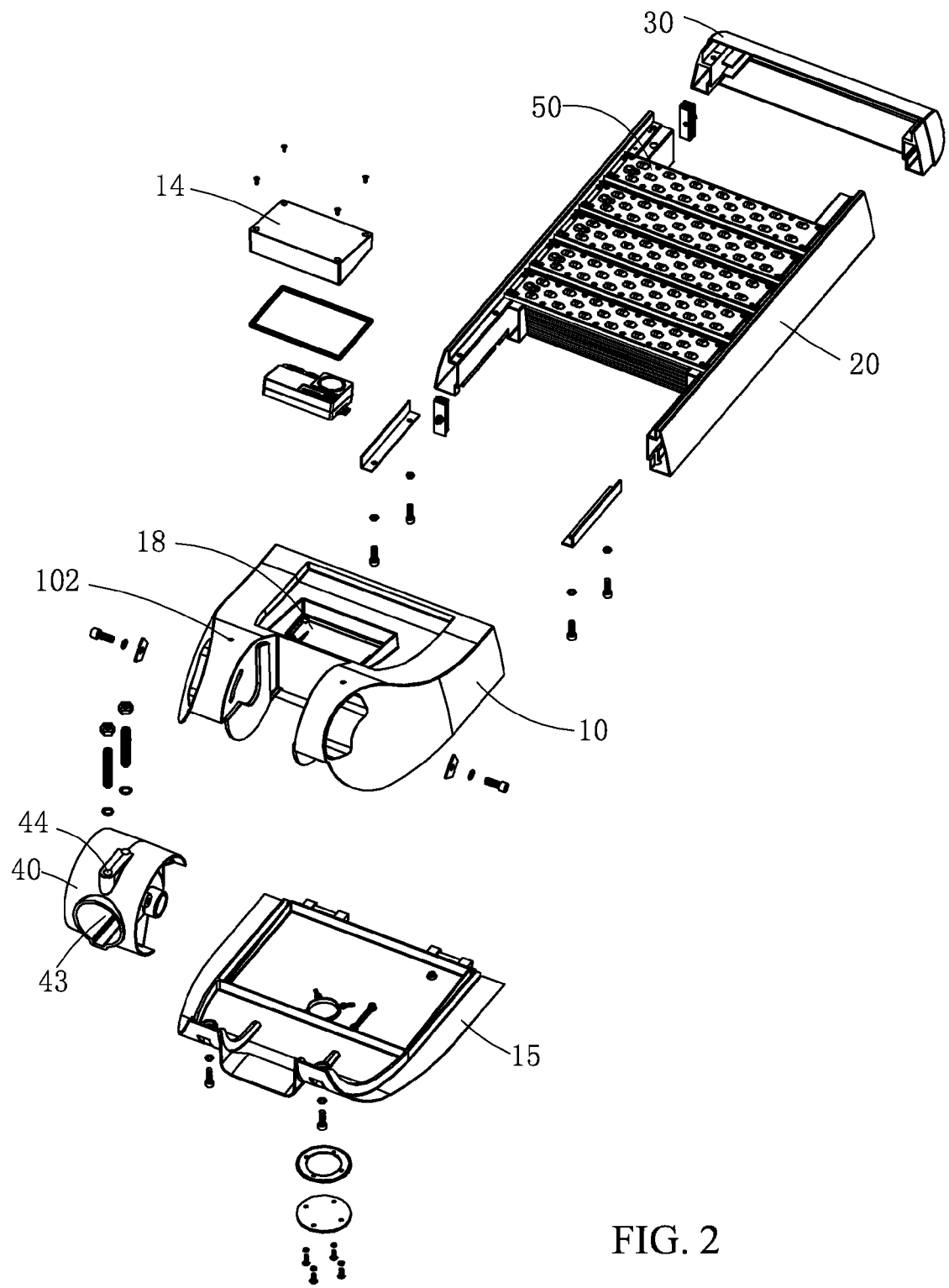
FIG. 2 is a partial exploded view of the modular LED street light in FIG. 1 from another point of view.

Please refer to FIG. 1 and FIG. 2, in an exemplary embodiment, a modular LED street light of the present invention mainly includes an electrical chamber 10, two supporting pipes 20, an end cap 30, a lamp arm 40 and a plurality of LED light source modules 50 configured in parallel. The electrical chamber 10 is mainly used for receiving and protecting a power module 60 of the street light, and fixing the supporting pipe 20 and the lamp arm 40. The power module 60 is mainly used for supplying power for the LED light source modules 50, it may include, but not limited to driving power supply, lightning protector, etc. To clearly described the present invention, a front (side) which is in a light emitting direction or in a direction parallel to the light emitting direction of the street light, and a back (side) which is in a back side of the light emitting direction of the street light are defined hereinafter.

Each supporting pipe 20 is elongated hollow tubular, preferably is an aluminum section with some bending parts. The supporting pipe 20 includes a light source module fixing part 23, and also includes a locating end 21 and a free end 22 located at the two ends of the light source module fixing part 23, respectively. The locating end 21 is fixed to the electrical chamber 10, the free end 22 is fixed to the end cap 30, the two supporting pipes 20 are set in parallel like beams between the electrical chamber 10 and the end cap 30. The electrical chamber 10, the two supporting pipes 20 and the end cap 30 are connected to be a substantially rectangle frame. The plurality of LED light source modules 50 are fixed between the light source module fixing parts of the two supporting pipes 20 side-by-side in a bridging form. Furthermore, a gap larger than 3 mm and smaller than 20 mm exists between each two adjacent LED light source modules 50. Thus, air convections exist between the light source modules, it is good for heat dissipation. Furthermore, when one of the light source modules is maintained, the other light source modules will not be affected. When it is required to increase or decrease the number of the LED light source modules 50 for the purpose of increasing or reducing the power of the LED street light, all that is needed is exchanging with lengthened or shortened supporting pipes 20 and adding or reducing corresponding number of the LED light source modules, thus, enabling a power seriation of the street light at very low manufacture and maintenance costs. The supporting pipes 20 are aluminum sections with some bending parts, thus has high strength and advanced stability.

Figure 3:
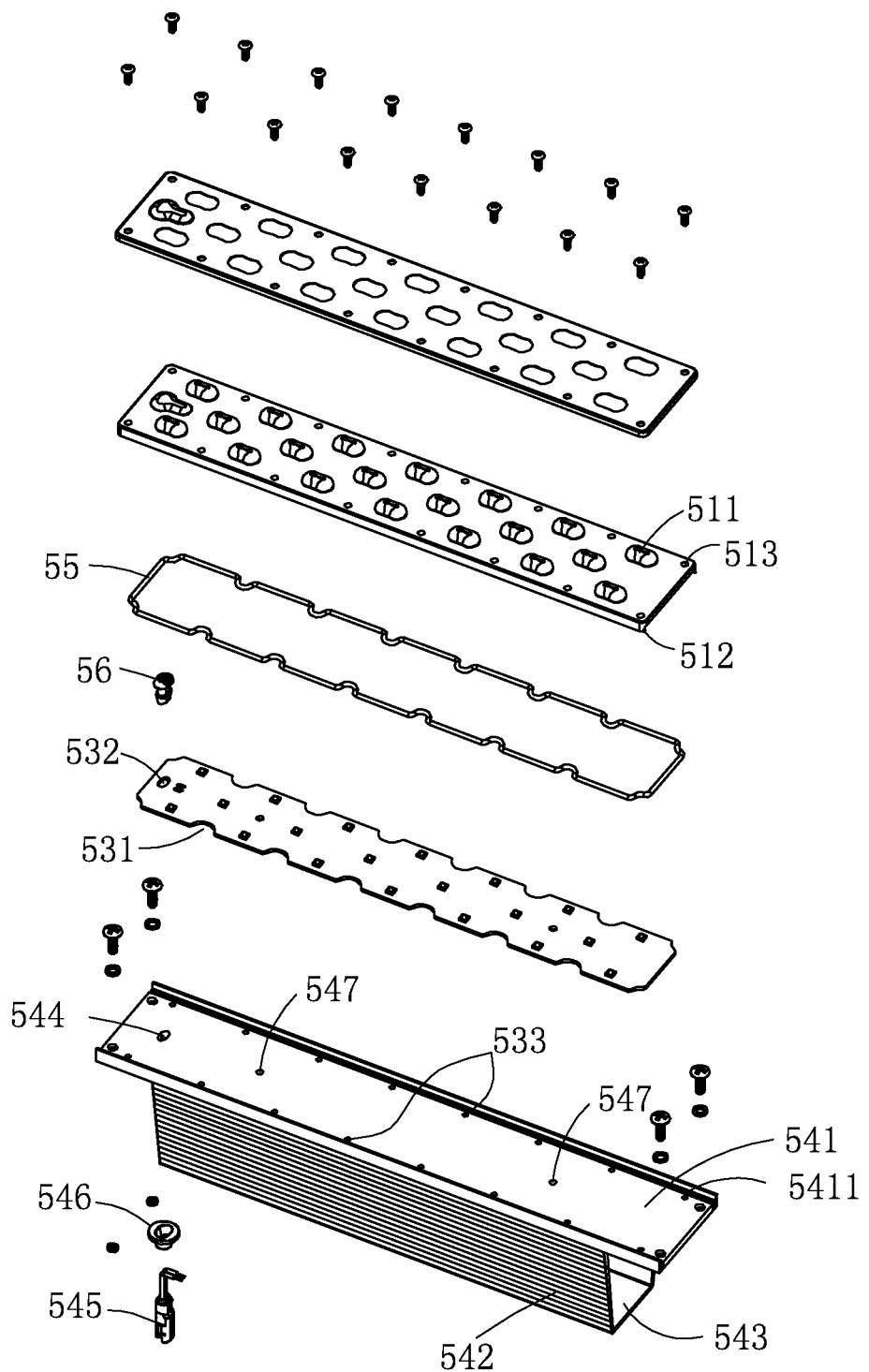
FIG. 3 is an exploded view of an LED light source module in FIG. 1 from an opposite point of view.

Please also refer to FIG. 3, in the embodiment, each LED light source module 50 mainly includes a rectangular light-transmitting board 51, a protective plate 52, a circuit board 53 and a radiator 54. A plurality of lenses 511 are formed on the light-transmitting board 51, and protrude outwardly from a front surface (the surface towards the front side of the street light) of the light-transmitting board 51. Two locating posts 5114 protrude backwardly from a back surface (the surface towards the back side of the street light) of the light-transmitting board 51. The protective plate 52 is snugly attached to the front surface of the light-transmitting board 51, and it defines a plurality of through holes matching with the lenses 511. The protective plate 52 is used for protecting the lenses 511, and can reinforce the function of the water resistant and the impact-resistance result of the LED light source module 50. The circuit board 53 is fixed at the back surface of the light-transmitting board 51. LED light sources corresponding to the plurality of lenses are configured on the circuit board 53. In the embodiment, first locating holes 533 and second locating holes 547 matching with the locating posts 5114 of the light-transmitting board 51 are form on the circuit board 53 and the radiator 54, respectively. The locating posts 5114 pass through the first locating holes 533 and the second locating holes 547, the lenses 511 of the light-transmitting board 51 and the LED light sources are located at the right positions accurately. And the light-transmitting board 51, the protective plate 52, the circuit board 53 and the radiator 54 are fastened together via set bolts and are pressed tightly in turn.

Preferably, the radiator 54 is also an aluminum section with some bending parts, it mainly includes a rectangular first plate 541 attached snugly to a back surface of the circuit board, two second plates 542 extending integrally from two sides (referring to long sides, those not connect to the supporting pipes 20, of the first plate) of a back surface of the first plate 541 and substantially perpendicular to the first plate, and third plate 543 connecting the ends (referring to long sides bridging the supporting pipes 20) of the two second plates. The outside surfaces (facing outwards) of the two second plates 542 are wavelike, and a length of the second plate 542 is smaller than that of the first plate 541, thus the third plate 543 covers only a part of the first plate 541, resulting in a state that the two ends of the first plate 541 extend out the second and third plates of the radiator 54. The radiator having this structure helps to improve the heat dissipation efficiency, reinforce the strength of the radiator, and effectively prevent dusts, leafs, sandstones, bird craps from chronically accumulating on the radiator. Because there is kept a gap between each two adjacent LED light source modules 50 of the plurality of LED light source modules 50, tropospheric troughs can be generated in the gaps between different LED light source modules 50, allowing air enter the space between the second plates, thereby chimney effect cause by rising hot air and supplementary cool air can be utilized to generate convective air which exhausts heat on the LED light source modules 50. Thus, heat dissipation effect is improved. In addition, the corrugated ups and downs on the second plate increase effective heat dissipation area of the plates, the heat dissipation efficiency is better.

Figure 4:
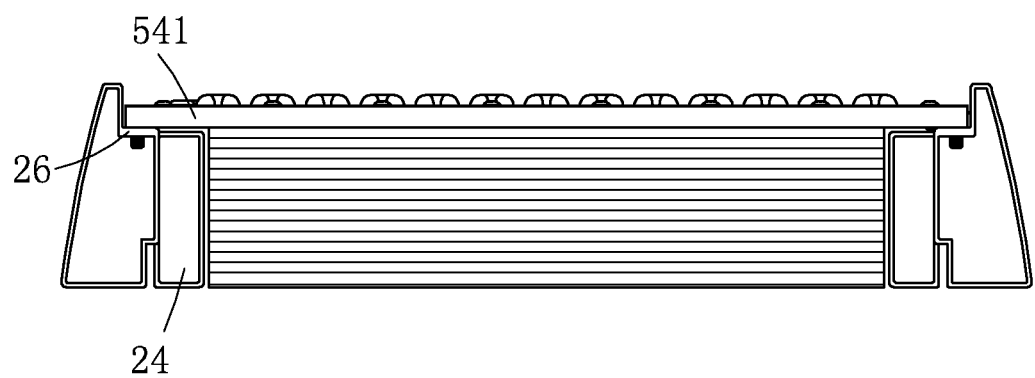
FIG. 4 is a sectional assembling schematic diagram of the supporting pipes and LED light source modules in FIG. 1.

Accordingly, please also refer to FIG. 1 and FIG. 4, a side wall, on contrary side of the LED light source modules 50, of each supporting pipe 20 is arced. Each supporting pipes 20 defines a plane 25 at a position facing the ends of the radiator 54. A step 26 used for positioning and fixing the part of the first plate 541 that protrudes out of the second plates 542 is formed at the edge of the plane 25. Because the radiator 54 and the supporting pipes 29 are connected and attached directly, thereby the supporting pipes 20 also have a heat dissipation effect, which improves the heat dissipation effect of the street light. A through-line tube 24 which is substantially tubular and is used for receiving power lines is formed on the plane 25. Two waterproof silicon rubber plugs are inserted in the two ends of the through-line tube 24, a plurality of wire holes allowing power lines to pass through are defined on the waterproof silicon rubber plugs. The power lines of the LED light source modules 50 pass through a through-line tube 24, enter to the power box of the electrical chamber 11 after passing through the wire holes of the waterproof silicon rubber plug, and connect to the output terminals of the power module in the power box.

Referring also to FIG. 3, two edge plates 512 extend integrally from the two sides of the light-transmitting board 51 and are perpendicular to the light-transmitting board. The first plate 541 of the radiator 54 defines two grooves 5411 for receiving the edge plates. The light-transmitting board 51 and the protective plate 52 define a plurality of fixed orifices 513 at their corresponding positions near their edges. A plurality of arced notches 531 corresponding to the fixed orifices 513 of the light-transmitting board are formed at two sides of the circuit board 53. A waterproof silicon rubber 55 whose shape is corresponding to the edge of the circuit board is sleeved on the edge of the circuit board 53. The protective plate is attached to the light-transmitting board, the light-transmitting board is attached to the circuit board, and the circuit board is attached to the first plate, thereby, the protective plate 52, the light-transmitting board 51 and the circuit board 53 can be fixed to the first plate 541 via set bolts.

The circuit board 53 is substantially rectangular. A plurality of LED light sources corresponding to the lenses 511 are electrically connected to the circuit board 53. The circuit board 53 and the first plate 541 respectively define corresponding line holes 532, 544. The power lines of the circuit board 53 connect to an external wire connector 545 after passing through the wire holes 532, 544. For the purpose of waterproof sealing, the waterproof silicon rubber 55 is sleeved on the edge of the circuit board 53, and silicon rubber plugs 56 are configured between the power lines and the wire holes 532, 544. When the protective plate 52, the light-transmitting board 51 and the circuit board 53 is fixed to the radiator 54 by set bolts, the waterproof silicon rubber 55 is pressed tightly between the light-transmitting board 51, the edge plate 512, the circuit board 53 and the radiator 54, by this time, the waterproof silicon rubber 55 will yielded deformation under pressure, and seal the gaps between the light-transmitting board 51, the edge plate 512, the circuit board 53 and the radiator 54, which makes sure the circuit board 53 and the LED light sources do not be affected with damp, the lifetime of the light source is assured.

Please refer to FIG. 1 again, the electrical chamber 10 defines an opening in its back side (in direction opposite a light emitting direction of the LED light source modules 50). A substantially rectangular power box 11 used for housing at least one power module 60 is configured in the opening. Two receiving grooves 12 used for receiving and fixing the locating ends of the two supporting pipes are formed at outsides of the power box 11, close to the two opposite side walls of the electrical chamber respectively. In other words, each receiving grooves 12 is formed between a side wall of the power box 11 and a side wall of the sell of the electrical chamber. The locating ends 21 of the supporting pipes 20 are inserted in the receiving grooves 12, and the two are fixed via a L-shaped fixing plate 122 and same set bolts 121.

Please refer to FIG. 2 again, the front wall, at the side of the light emitting direction of the LED light source modules 50, of the electrical chamber defines a sunken induction cavity 18 used for fixing an inductor. An edge defining the opening of the induction cavity is fixed an induction cavity cover 14 used for rotatably coving the induction cavity 18. A silicon rubber ring is also attached to the edge defining the opening of the induction cavity and is used for the waterproof of the induction cavity 18.

Please refer to FIG. 1 again, a power cavity cover 15 is set at the opening of the electrical chamber 10. The power cavity cover 15 is connected to an end, adjacent to the LED light source modules 50, of the electrical chamber 10 via a hinge structure 16. And the power box 11 and the locating ends 21 of the supporting pipes 20 are covered by the power cavity cover after the power cavity cover is closed. A flange extends outwardly from an inner surface of the power cavity cover 15 at positions corresponding to the edges of the power box 11. A waterproof silicon rubber ring is sleeved on the flange of the power cavity cover 15. When the power cavity cover 15 is closed, the flange faces the edges of the power box 11, the waterproof silicon rubber ring fills the joint between the flange and the edges of the power box 11, effectively prevent water from flows into the power source or the power source from being affected with damp.

A circular interface 151 which may be used for connecting a light controller is also configured at the power cavity cover 15. The interface 151 has a circular edge protruding outwardly and having a structural reinforcement and waterproof effects. A waterproof silicon rubber spacer is fixed in the interface. When the light controller is not connected to the interface, a light control hole cover 152 is installed on the waterproof silicon rubber spacer. The light control hole cover 152 is pressed on the waterproof silicon rubber spacer and is locked tightly to the lamp body 10 via four screws, playing a outside protection role and a waterproof role. When installing the light controller, remove the light control hole cover 152 firstly, then connected the base of the light controller to the power cavity cover 15 via screws. The design of the interface facilitates an installation of the light controller to be realized more conveniently and more quickly, improving the universality of the lamp body. The light controller refers to a light controller which can open or close the input of the power module of the street light according to a brightness of the ambient light, having a switch function.

Figure 5:
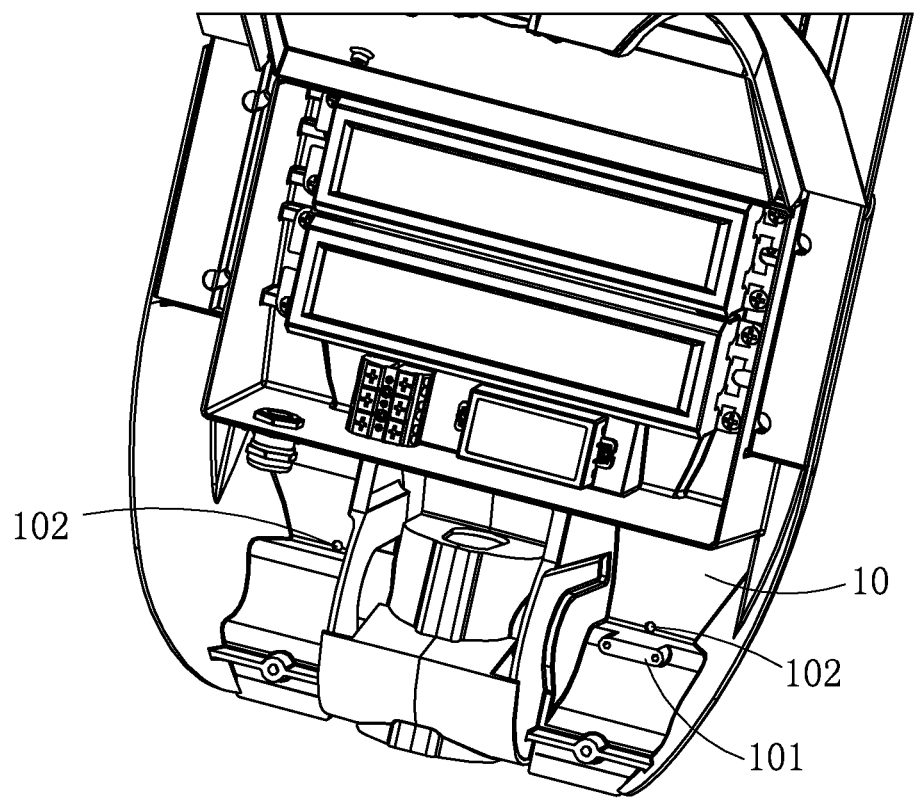
FIG. 5 is a partial schematic diagram of the modular LED street light in FIG. 1.
Figure 6:
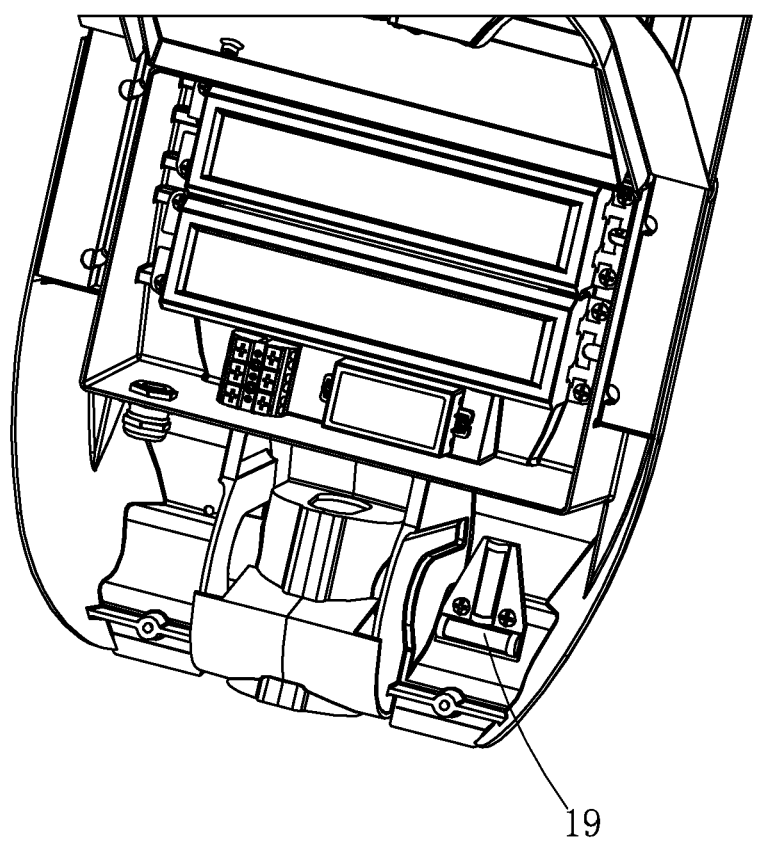
FIG. 6 is an installation diagram of a level bubble in FIG. 4.

Please refer to FIG. 5 and FIG. 6, a boss 101 used for fixing a level bubble 19 and having a substantially waist-shaped shape is formed in the electrical chamber 10. The boss 101 is adjacent to an external of the side wall, far away from the LED light source modules 50, of the power box 11. In addition, two leakage holes 102 are defined at the bottom of the electrical chamber, adjacent to the two sides of the lamp arm chamber. When the operator assembles the street light, he/she can recognize the assemble levelness accurately.

Please refer to FIG. 1 and FIG. 2 again, the lamp arm 40 includes a hollow circular tube 43 used for receiving and fixing the street light lamp post, two protruding tubes 41 protrude outwardly from a position, adjacent to an end of the circular tube 43, of the sidewall of the circular tube 43. The axes of the protruding tubes 41 are in a straight line. The axes (a surface containing the cross section of the wall of a tube is formed by rotating a line segment around the axes) of the protruding tubes 41 preferably cross over and is perpendicular with the axes of the circular tube 43. The lamp arm 40 further includes an adjusting block 42 configured parallel with the protruding tubes 41. The adjusting block 42 is connected to the side wall of the circular tub 43, and two ends of the adjusting block 42 protrude out of the sidewall of the circular tube 43. The lamp arm 40 further includes a shell which is shaped substantially like a three quarters of a ring. Hereinafter, for describing conveniently, define a gap to refer to the remaining unsealed one quarter part of the ring, and define two openings to refer to the two ends of the ring. The shell 44 is configured to be centered on the axes of the protruding tubes 41, and the shell 44 defines a through hole corresponding to an end of the circular tube 43. The end of the circular tube 43 protrudes out through the through hole, the other end of the circular tube 43 extends towards the gap of the shell and connects with the inside surface of the shell 44. The adjusting block 42 is configured between the circular tube 43 and the inside surface of the shell 44, and is connected with both the circular tube 43 and the shell 44. The outside walls of the protruding tubes 41 are preferably connected with the inside surface of the shell 44 via some reinforcing ribs. The exist of the shell 44 makes the structure of the lamp arm 40 more strong, difficult to damage, have better exterior appearance, easily to conform to the appearance of the electrical chamber.

The electrical chamber further includes a lamp arm chamber 13 attached to the outside surface of the side wall 111, far away from the LED light source modules 50, of the power box 11. The lamp arm 40 is rotatably connected to the lamp arm chamber 13. The lamp arm chamber 13 includes two symmetric lamp arm retaining plates 131 configured opposite to each other. The two lamp arm retaining plates 131 extend integrally from the outside surface of the side wall 111. The shape of the retaining plate 131 matches with that of the shell 44. The retaining plates 131 define a substantially sectorial receiving groove corresponding to the protruding tubes 41. The lamp arm 40 can insert between the retaining plates 131 along the receiving grooves, and the protruding tubes are limited at the end (that is, the rounded corner of the sector) of the receiving grooves. Each retaining plate 131 also defines an arced slot 132 corresponding to the adjusting block 42. The arced slot is located in the receiving groove and adjacent to the margin of the receiving groove. The adjusting block 42 inserts in the arced slots 132, and can slides in the arced slots 132. The lamp arm 40 can rotate around the protruding tubes 41 in relative to the electrical chamber 10. The range of the rotation is limited by the arced slots 132. Two adjusting bolts 133 fixedly connected with the adjusting block 42 after passing through the arced slots 132, thereby an angle between the lamp arm and the power source chamber is fixed. The angle of the lamp arm can be adjusted by sliding the adjusting bolts 133 to corresponding positions in the arced slots 132. Particularly, the shell and the receiving groove which is substantially sectorial both play a limiting role in the angle adjustment between the lamp arm and the electrical chamber to some extent.

Understandably, the bolt fixing described above is preferably used with a cushion block or a spacer, and the surface, attaching the mounting surface, of the cushion block or the spacer preferably matches with the mounting surface, thus enhancing the connection strength.

The modular LED street light described above can realize power seriation with lower mold cost, has good heat dissipation effect, and easy to extend related intelligent controlling functions, convenient installation and maintenance. And the light sources are standard modularized. The cross section of the radiator of the LED light source module of the modular LED street light is hollow shaped, the area of heat dissipation is large, the heat dissipation efficiency is high. Furthermore, the LED light source modules of the present of the present invention are fixed between the two supporting pipes, when it is required to increase or decrease the number of the LED light source modules for the purpose of increasing or reducing the power of the LED street light, all that is needed is exchanging with lengthened or shortened supporting pipes structurally, thus enabling a power seriation of the street light at very low costs.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:
1. A modular LED street light, comprising:
an electrical chamber configure for receiving a power module;
a lamp arm connected to the electrical chamber;
an end cap;
two supporting pipes connected substantially parallel between the electrical chamber and the end cap; and
a plurality of light source modules connected between the two supporting pipes and configured in parallel with each other;

wherein there is a gap that is larger than 3 mm and smaller than 20 mm exists between each two adjacent LED light source modules;
wherein at least one of the plurality of LED light source modules comprising:
a rectangular light-transmitting board with a plurality of lenses formed thereon;
a circuit board configured below the light-transmitting board and comprising thereon a plurality of LED light sources corresponding to the plurality of lenses; and
a radiator configured below the circuit board and comprising:
a first plate snugly attached to a lower surface of the circuit board;
two second plates extending integrally from two sides of the first plate and substantially perpendicular to the first plate; and
a third plate connected to ends of the two second plates;
wherein surfaces, facing outwards, of the two second plates are wavelike.

2. The modular LED street light according to claim 1, wherein two edge plates extends integrally and perpendicularly from two sides of the light-transmitting board; the first plate of the radiator defines two grooves configured for receiving the two edge plates; the light-transmitting board defines a plurality of fixed orifices adjacent to the two sides of the light-transmitting board; a plurality of arced notches corresponding to the fixed orifices of the light-transmitting board are formed at two sides of the circuit board; a waterproof silicon rubber having a shape matching to that of an edge of the circuit board is sleeved on the periphery of the circuit board; at least two locating posts are extended perpendicularly from the light-transmitting board and towards the circuit board; locating holes corresponding to the at least two locating posts are configured on the circuit board and the first plate, respectively; the locating posts of the light-transmitting board pass through the locating holes of the circuit board and insert in the locating holes of the first plate; furthermore set bolts fix the light-transmitting board and the circuit board to the first plate to clamp the circuit board between the light-transmitting board and the first plate.

3. The modular LED street light of claim 1, wherein the two supporting pipes are snugly attached to the two ends of the radiator, such that the supporting pipes act as a supplementary heat dissipation structure of the LED light source module.

4. The modular LED street light of claim 1, wherein the electrical chamber defines an opening in a direction opposite a light emitting direction of the LED light source modules; a substantially rectangular power box used for housing the power module is configured in the electrical chamber via the opening; two receiving grooves are formed between the side walls of the power box and the electrical chamber respectively; locating ends of the two supporting pipes are inserted in the receiving grooves respectively and are fixed therein.

5. The modular LED street light of claim 4, wherein a power cavity cover is configured at the opening of the electrical chamber, the power cavity cover is connected to an end, close to the plurality of the LED light source modules, of the electrical chamber via a hinge structure; furthermore, the power cavity cover covers the power box and the locating ends of the supporting pipes when the power cavity cover is closed.

6. The modular LED street light of claim 5, wherein a circular interface for mounting a light controller is formed on the power cavity cover, the interface has a circular edge protruding outwardly, a waterproof silicon rubber spacer is fitted in the interface.

7. The modular LED street light of claim 1, wherein the electrical chamber comprises a lamp arm chamber rotatably connected to the lamp arm; the lamp arm comprises a hollow circular tube configured for receiving and holding a lamp post of the street light, two protruding tubes protrude outwardly from the sidewall of the circular tube, axes of the protruding tubes are both in a straight line; the lamp arm further comprises an adjusting block configured parallel with the protruding tubes, the adjusting block is connected to the side wall of the circular tube; lamp arm chamber comprises two symmetric lamp arm retaining plates configured opposite to each other; each retaining plate defines a receiving groove which is substantially sectorial at a position corresponding to the protruding tubes; the lamp arm can insert between the retaining plates along the receiving grooves, and the protruding tubes are limited at ends of the receiving grooves; an arced slot corresponding to the adjusting block is defined in each retaining plate; the adjusting block insert in the arced slots and can slides in the arced slots; two adjusting bolts pass through the arced slot, fixedly connected with the adjusting block, and clap the retaining plates therebetween.

8. The modular LED street light of claim 7, wherein the lamp arm further comprises a shell which is shaped substantially like a three quarters of a ring; the shell is configured be centered on the axes of the protruding tubes and connected with the circular tube; the shell defines a through hole corresponding to an end of the circular tube; an end of the circular tube protrudes out through the through hole, the other end of the circular tube extends towards a gap of the shell and connects with the inside surface of the shell; the adjusting block is configured between the circular tube and the inside surface of the shell, and is connected with both the circular tube and the shell; the lamp arm retaining plates are received inside the shell.

9. The modular LED street light of claim 1, wherein the LED light source module further comprises a protective plate snugly attached to an upper surface of the light-transmitting board, the protective plate defines through holes matching with the lenses.

10. The modular LED street light of claim 1, wherein an outer wall in a direction, parallel to a light emitting direction of the LED light source modules, of the electrical chamber defines a sunken induction cavity configured for fixing an inductor; an edge defining the opening of the induction cavity is removably fixed an induction cavity cover used for coving the induction cavity, and a silicon rubber ring is configured between the induction cavity cover and the edge defining the opening of the induction cavity and is used for the waterproof of the induction cavity.

11. The modular LED street light of claim 1, wherein a boss used for fixing a level bubble is formed in the electrical chamber; the electrical chamber defines at least one leakage hole at each of the two outer sides of the lamp arm chamber.

12. The modular LED street light of claim 1, wherein at least one of the two supporting pipes is configured a through-line tube, power lines connecting the plurality of light source modules and the power module pass through the through-line tube; waterproof silicon rubber plugs having the same shape as that of a cross section of the through-line tube are inserted in the two ends of the through-line tube; the waterproof silicon rubber plugs define at least two wire holes; positions a surface, facing the two ends of the radiator of the light source modules, of the through-line tube also defines a plurality of round holes; waterproof silicon rubber rings are sleeved on the round holes; the power lines of the light source modules pass through the waterproof silicon rubber ring, the through-line tube, the waterproof silicon rubber plug successively, then enter the power box of the electrical chamber, and connect with the output terminals of the power module in the power box.

13. An LED light source module used in a modular LED street light, comprising:
   a rectangular light-transmitting board with a plurality of lenses formed thereon;
   a circuit board configured below the light-transmitting board and comprising thereon a plurality of LED light sources corresponding to the plurality of lenses; and
   a radiator configured below the circuit board and comprising:
   a first plate snugly attached to a lower surface of the circuit board;
   two second plates extending integrally from two sides of the first plate and substantially perpendicular to the first plate; and
   a third plate connected to ends of the two second plates;
   wherein surfaces, facing outwards, of the two second plates are wavelike;
   wherein the plurality of lenses are integrated on the rectangular light-transmitting board as a whole;
   wherein two edge plates extend integrally and perpendicularly from two sides of the light-transmitting board; the first plate of the radiator defines two grooves configured for receiving the two edge plates; the light-transmitting board defines a plurality of fixed orifices adjacent to the two sides of the light-transmitting board; a plurality of arced notches corresponding to the fixed orifices of the light-transmitting board are formed at two sides of the circuit board; a waterproof silicon rubber having a shape matching to that of an edge of the circuit board is sleeved on the periphery of the circuit board.

14. The LED light source module of claim 13, wherein at least two locating posts are extended perpendicularly from the light-transmitting board and towards the circuit board; locating holes corresponding to the at least two locating posts are configured on the circuit board and the first plate, respectively; the locating posts of the light-transmitting board pass through the locating holes of the circuit board and insert in the locating holes of the first plate; furthermore set bolts fix the light-transmitting board and the circuit board to the first plate to clamp the circuit board between the light-transmitting board and the first plate.

15. The LED light source module of claim 13, wherein the LED light source module further comprises a protective plate snugly attached to an upper surface of the light-transmitting board, the protective plate defines through holes matching with the lenses.

* * * * *